Patented July 29, 1941

2,250,940

UNITED STATES PATENT OFFICE 2,250,940

ART OF WELDING

Erwin A. Zahn, Guilderland Center, and James R. Patterson, Scotia, N. Y., assignors to General Electric Company, a corporation of New York No Drawing. Application May 26, 1939, Serial No. 275,912

7 Claims. (Cl. 219—10)

This invention relates to the art of welding and more particularly to the provision of a coating for preventing the adhesion of weld spatter to the fabricated parts during the welding operation.

An object of this invention is to provide, in the art of electrical welding, a coating easily applied as by spraying, brushing or dipping, which will prevent adhesion of the spatter of molten metal without interfering with the welding operation.

Another object is to provide a coating for metal parts to be welded which need not be removed after the welding operation and prior to the application of finishing coats.

Another object is to provide a protective coating in the welding art which will tend to volatilize rather than carbonize at high temperatures, and hence will not act as a source of carbon to make the weld hard or brittle.

A further object is to provide a non-corrosive, durable and abrasion-resistant coating which can be applied at any time prior to the storage of the metal to be welded and which will resist weathering during storage of the coated parts.

Further objects will become apparent from the following description of the invention.

As a spatter resistant coating material to prevent the adhesion of weld spatter to the metal surface surrounding the weld, we have found that certain resinous compositions containing phenolic or alkyd resins and a drying, semi-drying or non-drying oil or oil acid are particularly advantageous. Such resin-oil compositions, depending upon their constitution, will resist high temperatures, for instance, temperatures up to 600° C. without marked deterioration in their protective qualities. Due to this temperature resistance, the metal surface in the neighborhood of the weld proper is protected whether the weld is of a single or multiple pass type and when the coating has been allowed to harden, slag may be removed between passes, for instance, with a wire brush, without destroying the coating per se. Furthermore, when these compositions do volatilize or decompose at the high temperatures in close proximity to the welded area, only a minimum amount of non-injurious smoke or fog is given off with the result that the welder's glass remains clear. The dried protective compositions will not tend to form gas pockets or cause porosity within the weld itself.

Although any hardenable coating composition containing oils or oil acids combined or reacted with a synthetic heat hardenable resin, such as a phenolic resin or alkyd resin or both, have been found suitable, compositions comprising the combination of an oil or oil acid, a phenolic resin and an alkyd resin are outstanding. Such modified alkyd resin compositions may be prepared by any well-known means. For instance, the phenolic resin and oil may be incorporated with the alkyd resin either at the beginning of the reaction between the polyhydric alcohol and polybasic acid used in preparing the alkyd resin or may be added at an intermediate stage of the reaction in accordance with the well-known methods. The phenolic resin may be added at the same time as the oil or oil acid or at any time previous to or after the oil is incorporated. Furthermore, the phenolic resin need not be added as such. The components of the phenolic resin, that is, the phenolic body and the aldehyde may be used. Finally, the phenolic resin, the oil or oil acid or mixture thereof and the alkyd resin, may be mixed under heat and the resulting mixture used as a spatter-resistant coating.

The presence of resin acids, such as rosin, has also been found to be advantageous and, if such is used, it may replace part of the phenolic resin, with a resultant decrease in cost of the coating materials. A particularly suitable spatter-resistant coating is that comprising the combination or reaction product of oil, rosin, phenolic resin, and alkyd resin. Instead of the synthetic resin ingredients, their reacting components may be used in preparing the coating composition.

The coating is normally applied to the metal to be fabricated by welding in liquid form. For instance, the resin or mixture of resins may be dissolved in a suitable solvent, such as turpentine, petroleum spirits or xylol, to form a varnish and this varnish applied to the metal surfaces. If desired, metallic driers may be added in small amounts for the purpose of decreasing the time necessary for air-drying the varnish. On the other hand, driers are not necessary if the varnish coating is baked.

An example of a preferred composition for preventing adhesion of weld spatter is as follows:

| | Percent |
|---|---|
| Linseed oil acids | 20 |
| China-wood oil | 20 |
| Rosin | 20 |
| Phenolic resin | 5 |
| Glycerine | 13 |
| Phthalic anhydride | 22 |
| | 100 |

The reaction is carried out at a temperature between 200° and 280° C. until a phenolic-oil-rosin modified alkyd resin is formed and the desired viscosity is obtained. After cooling, the resin is dissolved in a suitable solvent with or without the addition of a drier and then is applied to the steel or other metallic article which is to be fabricated by welding.

Although the above is a suitable composition for our purpose, we do not wish to be limited to the exact composition set out in that example. Other oils could be used and the proportions may be varied. For example, a phenolic-oil-alkyd resin reaction product made up from the following ingredients can be used:

|  | Per cent |
|---|---|
| Soya oil acids | 50 |
| Phenolic resin | 15 |
| Glycerine | 14 |
| Phthalic anhydride | 21 |
|  | 100 |

In this formula, the oil acids may be replaced by the mono- or di-glyceride and the amount of phenolic resin used may be decreased considerably. The presence of at least 3% of the phenolic resin or its reacting components is particularly beneficial in improving the drying time and other characteristics of the coating.

In the latter example, rosin or a rosin acid may be substituted for part of the phenolic resin. Although the oil-synthetic resin varnishes described have proven valuable for practicing the invention, other similar resinous compositions which are within the scope of our invention will become apparent to one skilled in the art. The specific compositions set out in the examples are particularly good from the standpoint of flexibility, cost, ease of application, and resistance to the adhesion of weld spatter.

In applying this modified alkyd resin composition, any of the well-known methods may be followed. Spraying is preferred since this method insures a thinner coat which is not only more economical but also dries more quickly and, so long as care is taken that the surface is completely covered, a thin coat will protect the metal as well as a thicker one. The coating air-dries in a short time and, if desired, the rate of drying may be increased by baking the coated article. The parts are then brought into welding position and welded together by the usual methods. Welding can be started while the coating is still wet but better results will ordinarily be obtained if it is allowed to dry.

Any desired portion of the metal surface may be covered with the described coating material including the limited surface or area actually to be welded. The coating does not interfere with the quality of the weld or the time necessary to perfect the welded seam or joint as is the case with materials heretofore used for this purpose. Ordinarily the electrical contact requisite for welding can be established through the spatter-resistant film although at times it may be necessary to scratch through the coating with the welding electrode or some other pointed tool to obtain the proper contact.

The materials disclosed, besides serving to resist or prevent the adhesion of weld spatter to the welded parts, also act as excellent, tightly-adhesive priming coats for the application of additional finishing coats of lacquer or enamel. If properly modified by the addition of rust-inhibiting compounds, the coating will protect the steel during storage prior to and after the welding operations. Suitable compounds of this type, which do not interfere with the welding operations, are the red oxide of iron, or a mixture of zinc oxide and metallic zinc dust.

An example of one coating composition of this type is as follows:

|  | Per cent |
|---|---|
| Resin solution | 43 |
| Zinc dust | 34 |
| Zinc oxide | 9 |
| Dipentene | 13 |
| Drier solution | 1 |
|  | 100 |

In this example, the zinc dust and zinc oxide may be replaced by iron oxide or, if desired, either the dust or the oxide may be omitted with a corresponding increase in the amount of the remaining ingredient. Other dyes or pigments which do not interfere with the welding operation may be added for the purposes of imparting the desired color to the coating composition.

Although our improved process has proven suitable with any type of welding, it is particularly applicable to the art of arc welding wherein there is a considerable formation of weld spatter during the welding operations. By coating those surfaces of the article which are to be welded with our improved composition, the adhesion of weld spatter is prevented thus eliminating the necessity for chipping or grinding the weld spatter from the metal surface subsequent to the welding operation. A simple brushing or wiping operation is all that is needed to remove the spatter as compared with the old method involving the laborious and costly operations of grinding or chipping away the tightly adhering spatter from the metal surface surrounding the weld.

One of the many possible fields of use for our coating is structural steel welds. Prior to our invention the steel was usually painted with some rust-inhibiting coating containing red lead at the time it left the mill, care being taken not to coat that portion of the steel to be welded since the presence of the red lead composition on these portions resulted in an unsatisfactory weld. With our composition, the previously uncoated surface portion of the steel can be coated with our spatter-resistant coating or, if desired, the entire surface can be covered without in any way impairing the quality of the weld. Since the spatter-resistant coating may also serve as a priming coat, it need not be removed after the welding operation.

Other applications will readily become apparent to those skilled in the welding art. For example, in the ship building industry, the overlapping plates are ordinarily riveted together to form the hull of the ship as the paints used as a corrision inhibiter for the overlapping edges prevent satisfactory welding. By coating the edges of these plates with the herein described weld spatter-resistant coating, it is possible to weld the plates together instead of riveting them without losing the benefit of having the overlapping portions coated with a protective coating.

What we claim as new and desire to secure by Letters Patent of the United States is:

1. In the art of welding, the steps of coating the surfaces of the parts to be welded with a heat hardenable synthetic resin-oil varnish composition containing as the synthetic resin component one or more resins selected from the class consisting of phenolic resins and alkyd resins and welding said parts.

2. The method of preventing the adhesion of weld spatter to metal parts being welded which comprises coating said metal parts prior to welding with a phenolic resin modified, oil modified alkyd resin composition and welding said parts.

3. In the process of making a welded joint between two metal parts, the steps of coating at least those portions of the surfaces of the metal parts to be welded with a phenolic resin modified, oil modified alkyd resin composition, bringing said parts together and welding said parts.

4. The method of making an arc-welded joint between metal articles which comprises coating at least a portion of the surfaces of said metal articles with a coating of a composition that does not interfere with the welding operations comprising a heat hardenable synthetic resin-oil varnish in which the synthetic resin comprises one or more resins selected from the group consisting of phenolic resins and alkyd resins, bringing said metal articles together in welding position, and forming a weld therebetween.

5. The process of joining metal parts by welding which comprises applying to those surfaces of said metal parts to be welded a heat-resistant coating containing a rosin-oil-phenolic resin-alkyd resin reaction product, said coating being resistant to the adhesion of weld spatter, drying said coating, bringing the coated surfaces of said metal parts into welding position and forming a weld therebetween.

6. In the process of making a welded joint between two metal parts, steps of coating at least those portions of the surfaces of the metal parts to be welded with a phenolic resin-modified, oil-modified alkyd resin composition containing a mixture of zinc dust and zinc oxide, bringing said parts together, and welding said parts.

7. A lap welded joint comprising overlapping plates welded together, at least the overlapping portions of said plates being coated with a spatter-resistant protective coating comprising one or more resins selected from the group consisting of oil-modified phenolic resins and oil-modified alkyd resins and a rust inhibiting oxide which does not interfere with welding operations.

ERWIN A. ZAHN.
JAMES R. PATTERSON.